Sept. 2, 1969 T. J. LYNCH 3,465,103

SYSTEM FOR COMBINING PLURAL ISOLATED PHYSIOLOGICAL SIGNALS WITHOUT MUTUAL INTERFERENCE AND WITH REDUCED NOISE LEVEL

Filed June 23, 1966

INVENTOR
THOMAS J. LYNCH

BY Paris, Haskell & Levine

ATTORNEYS

United States Patent Office 3,465,103

Patented Sept. 2, 1969

3,465,103

SYSTEM FOR COMBINING PLURAL ISOLATED PHYSIOLOGICAL SIGNALS WITHOUT MUTUAL INTERFERENCE AND WITH REDUCED NOISE LEVEL

Thomas J. Lynch, Huntingdon Valley, Pa., assignor to United Aircraft Corporation, a corporation of Delaware Filed June 23, 1966, Ser. No. 559,832

Int. Cl. H04j 1/16

U.S. Cl. 179—15 8 Claims

ABSTRACT OF THE DISCLOSURE

A monitoring system for combining plural physiological signals is disclosed wherein each isolated body signal frequency modulates a "floating" subcarrier oscillator powered by a source isolated from the powering sources for the other oscillators, and the isolated FM signals are coupled together by an isolation transformer network.

Figures 1, 2:
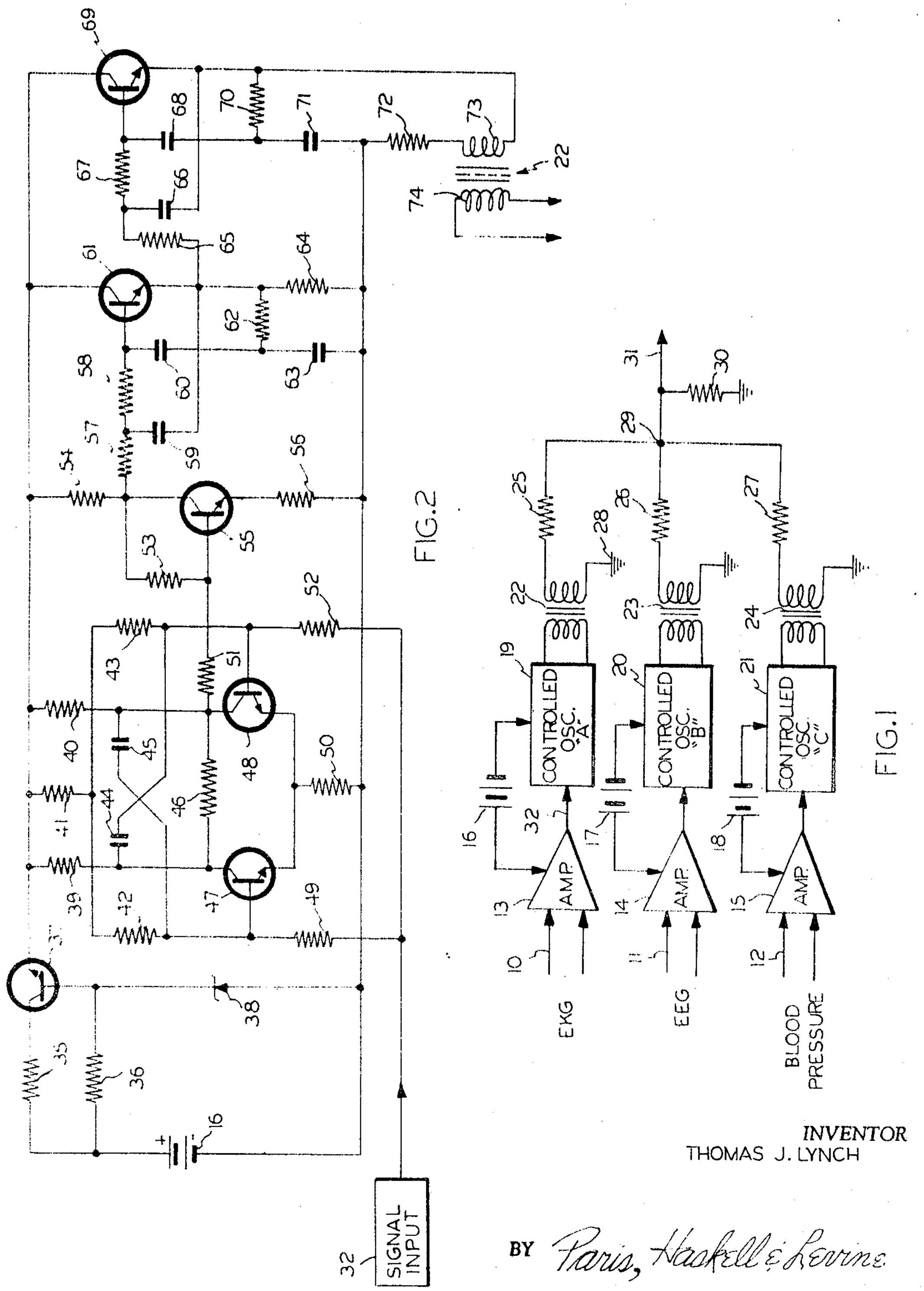

This invention generally relates to hospital monitoring systems and more particularly to such systems for obtaining plural low level physiological signals from a living body, converting said signals into frequency modulated eelctrical signals, and combining said FM signals in such manner as to completely isolate the sources and transmit the signals simultaneously to a remote location via cable or radio link.

With progressing improvements in the medical sciences it has become increasingly important in the care of patients, and in various areas of research, to provide simultaneous monitoring and recording of the functioning of plural living organs such as the heart, the brain, blood pressure, cell count and others. The various electrical signals transduced from the body and representing the waveforms produced by these organs are of both complex waveshape and of very low level in the order of millivolts or less. Consequently it is quite difficult and costly to obtain and transmit these signals to a remote location of a central monitoring station where these various physiological signals may be observed and continuously recorded without experiencing intensive crosstalk between the signals, and having the signals otherwise undistorted by noise and outside interference.

According to the present invention there is provided a system for this purpose that is not subject to this interference between signals and that substantially eliminates crosstalk, noise and other distortions. This is obtained by completely isolating the transducers and transducing equipment for one another by using separate and independent power sources, and additionally coupling the physiological signals to be transmitted in parallel by means of an isolating transformer and network.

It is accordingly a principal object of the invention to provide a monitoring and transmission system for multiple physiological signals that substantially eliminates distortion of the complex signals and other forms of interference.

A further object is to provide such a system that is relatively inexpensive and is constructed in modular form so as to permit the hospitals to combine a greater or lesser number of signals as desired.

Other objects and additional advantages will be understood by those skilled in the art after a detailed consideration of the following specification taken with the accompanying drawings wherein:

FIG. 1 is an electrical block diagram illustrating one preferred embodiment of the invention, and FIG. 2 is an electrical schematic diagram illustrating the circuit of one preferred channel of the system of FIG. 1.

Referring to FIG. 1, there is shown a multiple channel system according to the invention for combining three physiological signals comprising an electrocardio signal (EKG), an electroencephalo signal (EEG), and a blood pressure signal. It will be understood that a greater or lesser number of such physiological signals can be combined and transmitted in this fashion, as desired.

As shown, the EKG signal obtained from electrodes attached to the patient (not shown) is directed by means of very short leads to an amplifier 13 where the signal is amplified and thence applied to a voltage controlled oscillator 19 where the amplified signal is employed to frequency modulate the oscillator 19. The resulting frequency modulation from oscillator 19 is applied to energize the primary winding of isolation transformer 22; and from the secondary winding of transformer 22, it is directed through a coupling resistor 25 to a common junction 29.

In this channel, both the amplifier 13 and oscillator 19 are energized by a battery source 16 or by a conventional DC to DC inverter circuit or AC to DC converter circuit that are isolated from any common ground and therefore are self contained units that are "floating" or isolated from any common ground connection. The EKG signal over lines 10 is also double ended and not interconnected by way of a common ground to the other channels. Additionally the amplifier 13 and oscillator 19 are also located very close to the patient being monitored so as to permit the use of very short electrical leads 10, which may be shielded if desired. Consequently there is little likelihood of extraneous noise being inductively picked up by the wires 10 and interfering with the low level EKG signal.

The second channel shown responds to an electroencephalo signal over lines 11 which is amplified by amplifier 14 and employed to modulate a voltage controlled oscillator 20 in the same manner as in the first channel; and similarly in the third and additional channels each of the physiological signals is likewise amplified and employed to modulate its associated VCO. The voltage controlled oscillators 19, 20, and 21 in the three channels are each selected to oscillate at a different center frequency whereby the frequency oscillations produced by these oscillators are in different frequency ranges and can be distinguished from one another. The second and third channels likewise employ isolation transformers 23 and 24 at the outputs of their VCO's, and the three frequency modulated signals are therefore completely isolated from one another by reason of using separate and independent powering batteries and separate output transformers so as to substantially eliminate the possibility of mutual interference between channels.

For simultaneous transmission of the three FM signals over a common output line, or by way of a common radio link, the secondary windings of the output transformers are connected to the common junction 29 by means of a resistance coupling network. In this network, one terminal of each secondary winding is directly connected to the junction 29 by a different one of resistors 25, 26, and 27, as shown, and the FM signals are summed at junction 29 across resistor 30 whose opposite end is coupled back in common to the remaining terminals of the secondary windings of the isolation transformers. This combination of isolating transformers and the resistor coupling network minimizes the possibility of feedback from one channel to another and sums the series of FM signals for simultaneous transmission from the junction 29 to the remote location of a central monitoring station (not shown). Since the FM signals are at different frequency ranges, the individual signals from each channel can be easily separated from the others at the remote end of the link by the use of appropriate filters, and then demodulated to reconstruct each of the original physiological signals from the three channels or more.

FIG. 2 illustrates one preferred voltage controlled oscillator circuit that may be employed in the system of FIG. 1 that is comprised exclusively of transistors and other solid state components to minimize size, weight and power consumption of the circuit.

As shown, a pair of transistors 47 and 48 are interconnected in mutual feedback to operate as a free running multivibrator, and the amplified physiological signal applied at input lines 32 is directed through resistors 49 and 52 to the base electrodes of these transistors to convert the amplitude variations of the input signal into changes in frequency of the multivibrator.

The square wave FM output signal from the multivibrator is directed through resistor 51 to the base element of transistor 55, which transistor 55 functions as a feedback stabilized amplifier to amplify the FM variations.

After amplification, the square wave FM signal is applied to a low pass filter comprising a resistor capacitor network, having resistors 57, 58, 62 and capacitors 59, 60, and 63 and thence to the base electrode of transistor 61 interconnected as an emitter follower stage for impedance transformation. This filter converts the square wave FM signal into a sinusoidal wave and the emitter follower stage provides a high input impedance and lower output impedance as necessary to efficiently couple the VCO signal to the primary winding of isolating transformer 21 without permitting feedback from the transformer 22. A second substantially identical R-C network and emitter follower connected transistors 69 is also preferably employed to provide a more nearly sinusoidal FM output signal and to provide the additional impedance transformation and isolation desired to provide substantially one way coupling of the signal to this isolation transformer 73. By reason of these two emitter follower stages, the impedance looking backward into the circuit from the output isolating transformer is very high and therefore the VCO's in each of the channels cannot feedback or interfere with the VCO's in the other channels.

Since each of the channels is energized by a separate battery source of potential that is isolated from the other channels, it is essential that the DC potential remain constant with ageing of the battery to prevent change in frequency or amplification. This is insured by using a voltage regulator stage for coupling the battery to each stage. As shown the voltage regulator stage includes a transistor 37, a Zener diode 38, and a pair of resistors 35 and 36. The transistor 37 is connected as a series regulator with its collector-emitter electrodes in series between the battery 16 and the DC power line energizing the VCO and the amplifier stages. The Zener diode provides a fixed potential at the base electrode, and any variations in the battery potential referenced to the Zener potential appear across voltage dropping resistor 35 tending to maintain the voltage energizing the circuit constant despite ageing and variations in the battery and the current drain by the circuit.

The voltage controlled oscillator stage is of a precision type that linearly varies its frequency in response to changes in amplitude of the signal input, and it is stabilized against spurious variations in frequency with changes in the impedance of the input signal source. This stabilization of the circuit is described in a copending application of the same assignee, Ser. No. 222,345, filed Sept. 12, 1962, now Patent No. 3,246,258, and accordingly a further description is considered unnecessary.

Although but one preferred embodiment of the invention has been illustrated and described, many changes and variations may be made by those skilled in this art without departing from the spirit and scope of this invention. Accordingly this invention should be considered as limited only by the following claims appended hereto.

What is claimed is:

1. A multiplexing monitoring system for combining multiple physiological functions without mutual interference comprising: a plurality of independently operating subcarrier oscillators, each having a different center frequency of oscillation, means coupling each oscillator to respond to a different physiological function and produce a complex frequency modulated signal corresponding to the complex physiological function being monitored, a plurality of electrically isolated power sources, each energizing a different oscillator, a plurality of isolation transformers with one for each oscillator, each transformer having its primary winding energized by a different oscillator, and means coupling the secondary windings of said transformers in common to multiplex the plurality of frequency modulated signals.

2. In the system of claim 1, said electrically isolated power sources comprising electrical batteries.

3. In the system of claim 1, said means coupling the secondary windings comprising a resistance network including a series of resistors each coupling one terminal of a different secondary winding to a common junction, and a resistance coupling the common junction to all of the remaining terminals of the plurality of secondary windings.

4. In the system of claim 1, each oscillator including a double ended coupling stage interconnected to both terminals of the primary winding of its associated transformer thereby to provide complete isolation between the various physiological functions.

5. In the system of claim 1, said electrically isolated power sources comprising DC to DC converters.

6. In the system of claim 1, said electrically isolated power sources comprising AC to DC converters.

7. In the system of claim 1, means for stabilizing each of said isolated power sources.

8. In the system of claim 1, means for each subcarrier oscillator providing a high impedance energizing the primary winding.

References Cited

UNITED STATES PATENTS

| | | | |
|---|---|---|---|
| 3,210,747 | 10/1965 | Clynes | 128—2.1 XR |
| 3,253,588 | 5/1966 | Vuilleumier et al. | 128—2 |
| 3,296,557 | 1/1967 | Petts et al. | 333—11 |
| 3,330,969 | 7/1967 | Loyen | 330—10 |
| 2,184,075 | 12/1939 | Goldstein | 179—15 XR |
| 2,379,614 | 7/1945 | Tunick | 325—163 XR |
| 3,176,226 | 3/1965 | Berger | 179—15 |
| 3,281,715 | 10/1966 | Folz et al. | 307—271 XR |
| 3,332,038 | 7/1967 | Stanley | 179—15 XR |
| 2,747,149 | 4/1952 | Azgapetian | 340—207 XR |

FOREIGN PATENTS 718,131 11/1954 Great Britain.

OTHER REFERENCES

Cmdr. Norman L. Barr: The Radio Transmission of Physiological Information, Military Surgeon, vol. 114, No. 2, February 1954, pp. 79–83.

ROBERT L. GRIFFIN, Primary Examiner

CARL R. VON HELLENS, Assistant Examiner

U.S. Cl. X.R.

128—2.1; 325—163, 183